Figure 1:
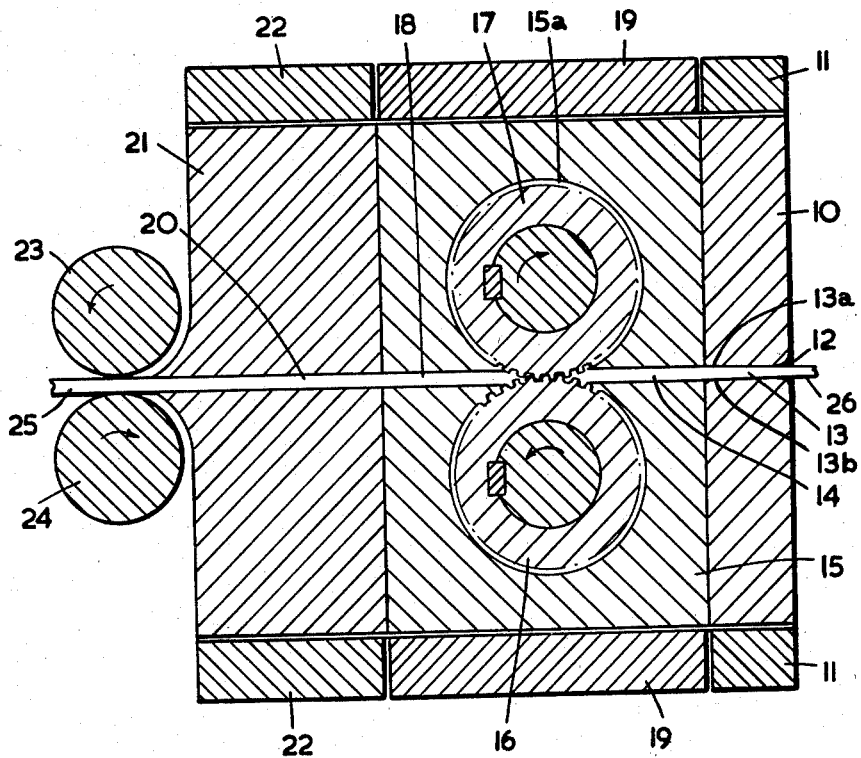

Jan. 14, 1958 P. R. HAWTIN ET AL 2,819,493
PRESSERS FOR EXTRUDING FILMS
Filed March 26, 1954 2 Sheets-Sheet 1

P. R. HAWTIN
H. E. B. YOUNG
INVENTORS

PATENT ATTORNEYS

United States Patent Office 2,819,493
Patented Jan. 14, 1958

2,819,493

PROCESS FOR EXTRUDING FILMS

Philip Richard Hawtin and Harry Edward Bellairs Young, Spondon, near Derby, England, assignors to British Celanese Limited, a corporation of Great Britain Application March 26, 1954, Serial No. 419,066

Claims priority, application Great Britain April 8, 1953

3 Claims. (Cl. 18—55)

This invention relates to the manufacture of extruded products of substantially rectangular cross-section, e. g. films, by extruding an organic film-forming thermoplastic composition in a temporarily heat-fluidized condition through a suitably shaped die-orifice.

The primary object of the present invention is to provide an improved method for the manufacture of films by the so-called dry extrusion process. In this process thermoplastic material, in the absence of any volatile liquid, is raised to a temperature at which it has the fluidity necessary for successful extrusion and is extruded through a die-orifice of substantially rectangular cross-section, and the extruded material is drawn away from the orifice and in the course of this drawing is converted into a self-sustaining film by cooling. Although dry extrusion has been effected by means of a ram working in a cylinder into which the thermoplastic material is fed, a screw extruder is generally employed, the material being fed, at a temperature at which it is still hard, into the rear end of the extruder barrel and being forced along said barrel by the rotation of a screw, or a plurality of intermeshing screws, working within the barrel, and progressively raised in temperature during its passage along the barrel. Between the forward end of the extruder barrel, whether this be of the ram or screw type, and the die-aperture, the thermoplastic material must fan out from a circular cross-section to a rectangular cross-section in which the ratio of width to depth is relatively high. It has been found very difficult to design the passage from the forward end of the extruder to the die-aperture in such a way that the rate of flow is substantially uniform at different points along the width (the long dimension) of the aperture. Unless the flow to the central region of the aperture be restricted in some way, the flow to that region will be more rapid than that to regions on either side owing to the path of the material to the central region being the shortest. In consequence the thickness of the film obtained will vary across its width. With a view to counteracting this effect it is customary to restrict the flow to the central region of the orifice by providing a suitable obstruction in the passage. The design of a suitably shaped passage, however, is empirical and presents considerable difficulty. Construction also is difficult and expensive, involving hand work in hard material.

According to the present invention, in making extruded products of rectangular cross-section by extruding a thermoplastic composition in a temporarily heat-fluidized condition through a suitably shaped die-orifice, the material is fed to a metering station, where it is continually positively fed at a substantially constant rate into the inlet end of a passage terminating in the die orifice, so as to cause extrusion of the composition through said orifice, said passage being bounded by four walls, including a pair of side walls the same distance apart as the length of said orifice, the minimum depth of the passage being equal to the width of said orifice, the feed into said passage per unit length of its width being substantially uniform over said width, and the arrangement being adapted to cause the flow lines of the composition to be substantially parallel to the length of the passage. Preferably every cross-section of the passage, measured perpendicular to the side walls, is rectangular and the passage is straight. The arrangement should preferably be such that at no point along the path of the composition, from the region in which it is fed into the passage, to the die-orifice does the depth of the stream of composition increase. The depth of the stream may decrease along said length. The means for metering the material into the passage and impelling it along the passage may comprise rotary and positive pumping means, e. g. a gear pump, the rotors of which extend across the passage perpendicular to the side walls, as will be described below.

Various means are available for feeding the thermoplastic material to the metering station. The invention includes a process wherein the thermoplastic composition is fed continuously in solid form to a region in which the composition is converted to the heat-fluidized condition and caused to pass continuously from said region to the metering station. The composition may be converted to the heat-fluidized condition in a screw extruder from which it is continuously fed to the metering station. Another method is to feed a continuous length of the solid composition, e. g. a sheet, rod or band thereof, along a passage leading to the extrusion station, the material being gradually raised in temperature during its travel along the passage. The passage leading to the inlet of the metering pump should be so shaped that the material enters said inlet in the form of a stream of width equal to the passage from the pump to the die-aperture. Whatever method of feed is adopted the thermoplastic material must, of course, reach the metering pump in such a state of fluidity as to be capable of being metered by said pump into the passage leading to the die-aperture. When the material is fed from a screw extruder it may leave the extruder at a normal extrusion temperature for the material and this temperature may be maintained during passage to and through the metering station and from thence to the extrusion aperture. Or the temperature may progressively increase from the screw extruder to the extrusion aperture or may reach a maximum during its travel between the screw extruder and the die-aperture, e. g. between the metering station and said aperture. Suitable heating means provide for maintaining the desired temperature gradient between the inlet for the thermoplastic material and the die-aperture. The method of feeding the thermoplastic material in sheet form to the metering station is of particular advantage in conjunction with processes in which the thermoplastic material for use in the extrusion process is compounded on hot rolls. After the desired compounding has been effected, the material may be sheeted on the rolls and the sheets fed directly into the heated passage leading to the metering station.

Apparatus for performing the method of the invention comprises an extrusion die having a substantially rectangular aperture, a conduit terminating in the die-orifice, said conduit having a passage bounded by four walls, including a pair of side walls the same distance apart as the length of said orifice, the remaining pair of walls being at no point nearer together than the width of said orifice, heating means for the passage, said means located outside the passage, means for continually positively feeding the heat-fluidized composition, at a substantially uniform rate, into the inlet end of said conduit, so that the feed per unit width of said passage is substantially uniform over said width, the arrangement being adapted to cause the lines of flow of the composition to be substantially parallel to the length of the passage.

Thus one form of apparatus for performing the method of the invention comprises, in combination, a film extrusion die having a substantially rectangular aperture, a conduit for feeding thermoplastic material to the die, said conduit having a passage of rectangular cross-section registering with the die-aperture, the side walls of said passage being parallel and plane and perpendicular to said aperture and the remaining pair of walls of said passage being parallel to each other or convergent towards said aperture and at no point nearer together than the depth of said aperture, a rotary metering pump for metering thermoplastic material into said passage, the outlet of said pump registering with the inlet of said passage so that the rotor rotates about an axis (or the rotors rotate about axes) perpendicular to said side walls, means for feeding thermoplastic material in an appropriate state of fluidity to the inlet of said pump, and means associated with said pump and said conduit for regulating the temperature of the thermoplastic material throughout its course to the die.

The metering pump is preferably a gear pump comprising two intermeshing gear wheels, the axes of which are perpendicular to the side walls of said passage and situated one above and the other below the passage, the region in which said wheels intermesh extending across the whole width of the passage at the inlet end. The gear wheels are preferably spur wheels. Helical gear-wheel pumps can also be employed. Other forms of rotary metering pumps available are: internal gear pumps, multilobe pumps, vane pumps, especially sliding vane pumps, and pumps in which the rotor comprises an eccentrically mounted roller. As indicated above, the width of the rotor or rotors should be the same as that of the passage leading to the die-aperture.

The temperature regulating means associated with the apparatus for performing the method of the invention may comprise electrical heating circuits suitably disposed with respect to the various cavities to be heated, or passage may be provided for the circulation of an attemperating fluid, e. g. hot oil or molten metal. Induction heating is a further method that may be employed.

The feeding means may, as indicated above, comprise an extruder, preferably a screw extruder, adapted to deliver thermoplastic material in an appropriate state of fluidity to the inlet of the metering pump, or a device adapted to propel thermoplastic material in the form of sheets, bands or rods at a suitable rate into and along a passage leading to the inlet of the metering pump, said passage being provided with heating means. Means for propelling the material into the passage may comprise one or more pairs of rolls adapted to grip the material, at least one roll of each pair being driven. The rolls may be fluted or smooth or covered with resilient material.

The accompanying diagrammatic drawing shows, by way of example, one form of apparatus for performing the method of the invention.

Figure 2:
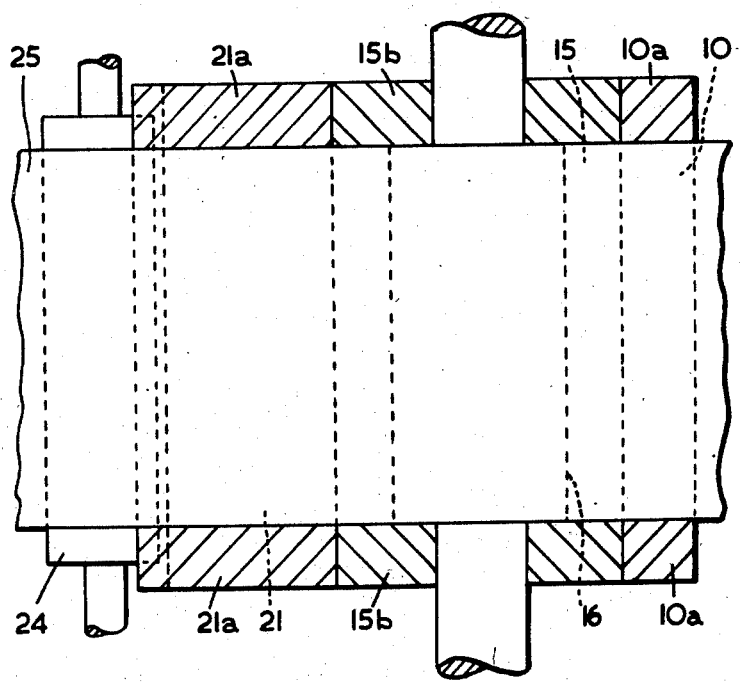

In the drawings Fig. 1 is a part-sectional elevation and Fig. 2 a plane view taken through the middle plane of the film 25 shown in Fig. 1.

In the drawings a die assembly 10 provided with electrical heating means 11 has a rectangular die-aperture 12 which communicates by a passage 13 with a corresponding passage 14 in the casing of the gear pump 15 having a pair of spur-wheel rotors 16 and 17 rotating in a chamber 15a, and an inlet passage 18. The passage 13 is rectangular in section along its whole length having a pair of plane parallel side walls formed by side plates 10A and top and bottom walls 13a and 13b which are plane and converge towards the die-aperture. Associated with the pump casing 15 are heating elements 19. The outlet passage 14 and the inlet passage 18 in the pump casing 15 are of rectangular section. The passage 14 has a pair of plane parallel side walls provided by side plates 15B. The width of these passages and the width of the rotors 16 and 17 are the same as the width of the passage 13 and of the die-aperture 12. The inlet passage 18 of the pump registers with a passage 20 in the conduit member 21 which is provided with heating means 22. The passage 20 is rectangular and of the same width and depth as the passage 18. It has a pair of plane parallel side walls provided by side plates 21A. The pair of feed rolls 23 and 24 serves to feed thermoplastic sheet material into the passage 20. These rolls are urged together by spring means (not shown) and the top roll 23 is driven through positively infinitely variable gear means.

In operation, thermoplastic sheet material 25 is fed by the rolls 23 and 24 into the passage 20, from which it passes via the inlet passage 18 to the pump chamber 15a from which it is metered into the outlet passage 14 and impelled along this passage, through the passage 13, and extruded through the die-aperture 12. The extruded material 26 is continuously drawn away from the extrusion aperture by means of a pair of draw rolls, and is cooled on its way to said rolls by means of air jets. The draw rolls and air jets are conventional features of dry extrusion apparatus and are not shown.

In another form of apparatus for performing the method of the invention, the feeding means comprises a screw extruder. This is connected by a conduit member having a passage which registers at one end with the outlet of the extruder and at the other with inlet passage 18 of the metering pump. The passage is so shaped as to cause the material fed from the extruder to fan out to the width of the passage 18. Heating means are associated with the conduit.

By the process of the invention, films may be made of thickness ranging from less than 0.005" (e. g. 0.003 to 0.004") to more than 0.01" (e. g. 0.05 to 0.10" or 0.10 to 0.50") and in width from less than 6" (e. g. 1 to 4") up to 20" or more (e. g. 24 to 36"). The advantages of the invention are particularly shown when making films in which the ratio of width to thickness is relatively high, e. g. at least 10:1, and especially 100:1 or more. On the other hand, the method of the invention is of advantage also in extruding rods of substantially rectangular section, including rods of square section. In general, since it is desirable to stretch the extruded product between the die and the takeup means, the die-aperture will usually be somewhat greater, e. g. by 20 to 30% or more, in each dimension than the final product required.

The following examples, in which all the parts are by weight, illustrate the process of the invention.

*Example 1*

The thermoplastic material had the following composition:

76 parts of cellulose acetate of acetyl value (calculated as acetic acid) 54%;
20 parts of diethyl phthalate;
4 parts of triphenyl phosphate.

The triphenyl phosphate was dissolved in the diethyl phthalate, the solution was sprayed on to the finely divided acetate and the mixture was then kneaded in a Werner Pfleiderer mixer. It was then transferred to a pair of hot mixing rolls on which it was thoroughly compounded and finally sheeted to a thickness of ⅛".

The thermoplastic sheet, at a temperature of 60° C., was fed between the feed rolls 23 and 24 of the apparatus shown diagrammatically in the drawing, and from thence passed along the passages 20 and 18 to the pump chamber 15a whence it was metered into the outlet passage 14 and was impelled along this passage and the connecting passage 13 and extruded from the rectangular die-aperture 12, the depth (i. e. the short dimension) of which was $\frac{1}{32}$". The heating elements 19 and 22 were so controlled that, during its travel through the passage 20, the material was gradually heated to 200 to 210° C. and was maintained within that range during its travel to the extrusion aperture. The material was drawn away from the aperture by a pair of feed rolls at such a speed that its thickness at the feed rolls was 75% of the depth of the die-aperture. During its passage to the feed rolls it was cooled by means of air jets so that no further stretch occurred after leaving the feed rolls. Beyond the feed rolls the material was reeled up.

*Example 2*

The thermoplastic material was of the same composition as that employed in Example 1. It was compounded as described in that example, but on passing from the mixing rolls in sheet form, while still hot and plastic, it was passed between a pair of scoring rolls which scoured it with grooves running along and across the sheet at right angles and was then cooled down to atmospheric temperature. The sheet material was then fed to a disintegrator which reduced it to dice-shaped granules. These granules were fed to a screw extruder from which the material was extruded at a temperature of 220° C. through a conduit member having a passage of which the inlet registered with the outlet of the extruder and the outlet registered with the passage 18 of the pump casing 15 shown in the drawing. Heating means associated with the conduit member and with the pump casing 15 and the die block 10 were operated so as to maintain the temperature substantially constant from the extruder to the die-aperture 12. The sheet formed was drawn away from the die, cooled and collected as described in Example 1.

Many variations may be made in the composition of the thermoplastic material. Other plasticizers that can be employed include: dimethyl phthalate, dimethoxyethyl phthalate, triacetin, dibutyl tartrate, acetyl triethyl citrate, methyl phthalyl ethyl glycolate, ethyl phthalyl ethyl glycolate, trichloroethyl phosphate and p-toluene sulphonamide. The cellulose acetate is preferably of acetyl value from 52 to 56%, but cellulose acetates of higher acetyl value, e. g. between 56 and 62.5%, and especially between 56 and 59%, can be used. Other cellulose derivatives that can be employed instead of cellulose acetate include other cellulose esters of carboxylic acids containing 2 to 4 carbon atoms in the molecule, e. g. cellulose propionate, cellulose butyrate, cellulose acetate propionate and cellulose acetate butyrate, and cellulose ethers such as ethyl cellulose and benzyl cellulose.

The invention has been described with particular reference to the use of thermoplastic material based on cellulose derivatives. The thermoplastic materials may, however, be based on other thermoplastic linear polymers, e. g. polymerized monovinyl and monovinylidene compounds such as polymers of vinyl chloride, especially copolymers with vinyl acetate and vinylidene chloride, polymers of methyl methacrylate and other thermoplastic acrylic acid derivatives, especially copolymers of acrylonitrile with methacrylonitrile, with vinyl chloride or with vinylidene chloride, polymers of ethylene, polymers of styrene and chloro-substituted styrenes, and condensation polymers such as the nylons and other polyamides, polyesters, polyester-amides and polyamino carboxylic acids.

Having described our invention, what we desire to secure by Letters Patent is:

1. In a process for making film by extruding a thermoplastic composition in a temporarily heat-fluidized condition through an aperture having the form of a straight slit, as a continuous operation, the following combination of steps: feeding said composition in solid coherent form along a straight path in the direction of extrusion; gradually converting said composition, by the application of heat while it is moving in said direction, into a stream; dividing said stream, in the plane longitudinally bisecting said slit, into two identical shallower streams; impelling each such shallower stream along an arcuate path at a constant rate which is uniform across the width of the stream, said arcuate paths being perpendicular to and on opposite sides of said plane; bringing said shallower streams together in said plane to form an outlet stream flowing in said direction to said slit, while maintaining the moving body of thermoplastic composition throughout its course to the aperture at a width equal to the length of said slit; allowing said outlet stream to issue from said slit; causing the stream so issuing to set to a film; and drawing away said film.

2. In a process for making film by extruding a thermoplastic composition in a temporarily heat-fluidized condition through an aperture having the form of a straight slit, as a continuous operation, the following combination of steps: feeding said composition in solid coherent form along a straight path in the direction of extrusion; gradually converting said composition, by the application of heat while it is moving in said direction, into a stream; dividing said stream, in the plane longitudinally bisecting said slit, into two identical shallower streams; impelling each such shallower stream along an arcuate path at a constant rate which is uniform across the width of the stream, said arcuate paths being perpendicular to and on opposite sides of said plane; bringing said shallower streams together in said plane to form an outlet stream flowing in said direction to said slit, while maintaining the moving body of thermoplastic composition throughout its course to the aperture at a width equal to the length of said slit and causing the depth of said outlet stream to decrease progressively along its course to the aperture; allowing said outlet stream to issue from said slit; causing the stream so issuing to set to a film; and drawing away said film.

3. In a process for making film by extruding a thermoplastic composition comprising plasticized cellulose acetate in a temporarily heat-fluidized condition through an aperture having the form of a straight slit, as a continuous operation, the following combination of steps: feeding said composition in solid coherent form along a straight path in the direction of extrusion; gradually converting said composition, by the application of heat while it is moving in said direction, into a stream; dividing said stream, in the plane longitudinally bisecting said slit, into two identical shallower streams; impelling each such shallower stream along an arcuate path at a constant rate which is uniform across the width of the stream, said arcuate paths being perpendicular to and on opposite sides of said plane; bringing said shallower streams together in said plane to form an outlet stream flowing in said direction to said slit, while maintaining the moving body of thermoplastic composition throughout its course to the aperture at a width equal to the length of said slit; allowing said outlet stream to issue from said slit; causing the stream so issuing to set to a film; and drawing away said film.

References Cited in the file of this patent

UNITED STATES PATENTS

| | | |
|---|---|---|
| 1,544,305 | Fisher | June 30, 1925 |
| 2,515,201 | Dulmage et al. | July 18, 1950 |
| 2,537,311 | Lyon | Jan. 9, 1951 |
| 2,717,418 | Piperoux et al. | Sept. 13, 1955 |